(12) United States Patent
Maeda

(10) Patent No.: US 9,294,652 B2
(45) Date of Patent: Mar. 22, 2016

(54) TECHNIQUE OF RELAYING COMMUNICATION BETWEEN IMAGE FORMING APPARATUS AND SERVER

(71) Applicant: Konica Minolta, Inc., Chiyoda-ku (JP)

(72) Inventor: Toshihiro Maeda, Sakai (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/583,251

(22) Filed: Dec. 26, 2014

(65) Prior Publication Data

US 2015/0207955 A1     Jul. 23, 2015

(30) Foreign Application Priority Data

Jan. 20, 2014  (JP) .................................. 2014-007649

(51) Int. Cl.
| | |
|---|---|
| *G06F 3/12* | (2006.01) |
| *H04N 1/21* | (2006.01) |
| *H04N 1/00* | (2006.01) |

(52) U.S. Cl.
CPC ............ *H04N 1/21* (2013.01); *H04N 1/00127* (2013.01); *H04N 1/00244* (2013.01); *H04N 2201/0039* (2013.01); *H04N 2201/0062* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,688,466 | B2 * | 3/2010 | Manchester | ......... G06K 15/005 358/1.15 |
| 8,830,508 | B2 * | 9/2014 | Mori | .................. H04N 1/00244 358/1.15 |
| 8,868,707 | B2 * | 10/2014 | Mehta et al. | ....... H04N 63/0884 709/223 |
| 9,036,171 | B2 * | 5/2015 | Ishibashi | ............ G06K 15/1809 358/1.1 |
| 2006/0061803 | A1 * | 3/2006 | Oka | ....................... G06F 21/445 358/1.15 |
| 2011/0314311 | A1 | 12/2011 | Maeda | |
| 2012/0110066 | A1 * | 5/2012 | Furuta et al. | ............ G06F 3/122 709/203 |
| 2013/0070780 | A1 * | 3/2013 | Hozumi | ........................ 370/437 |
| 2014/0268236 | A1 * | 9/2014 | Ohara et al. | ................. 358/1.15 |
| 2015/0043036 | A1 * | 2/2015 | Kamma | ...................... 358/1.15 |
| 2015/0101039 | A1 * | 4/2015 | Torigoshi et al. | ............... 726/17 |

FOREIGN PATENT DOCUMENTS

| | | |
|---|---|---|
| JP | 2009-044619 A | 2/2009 |
| JP | 2012-003664 A | 1/2012 |
| JP | 2013020455 A | 1/2013 |
| JP | 2013034073 A | 2/2013 |

OTHER PUBLICATIONS

Notice of Grounds of Rejection issued by the Japanese Patent Office on Dec. 1, 2015 in corresponding Japanese Application No. 2014-007649, with full English translation (7 pages).

* cited by examiner

*Primary Examiner* — Dung Tran
(74) *Attorney, Agent, or Firm* — Buchanan Ingersoll & Rooney PC

(57) ABSTRACT

A relay device that relays communication between an MFP and a server reads, upon accepting a request from the MFP to the server, a response to a previous one of this request from the server which has been cached in a memory. Then, the relay device transmits the response read from the memory to the MFP as a formal response prior to transmitting this request to the server and obtaining a response.

20 Claims, 9 Drawing Sheets

FIG.5

| Source Command/Parameters ||| | Target Command/Parameters ||||
| --- | --- | --- | --- | --- | --- | --- | --- |
| Protocol | Version | Command | Parameters || Protocol | Version | Command | Parameters |
| API | v1.0 | OAP_GetDefault | ScanSetting | Resolution | API | v1.0 | OAP_StartJob | ScanSetting.Resolution |
| | | | | Format | API | v1.0 | OAP_StartJob | ScanSetting.Format |
| | | | | Format | TCP-Sock | v1.0 | TCP-SendJob | ScanSet.Format |

FIG.6

| API | | | | TCP-Sock | | | |
|---|---|---|---|---|---|---|---|
| v1.0 | Parameters | | | v1.0 | Parameters | | |
| OAP_GetDefault | ScanSetting | Resolution | | TCP_GetDefault | ScanSet | Resolution | |
| | | Format | | | | Format | |
| | PrintSetting | Size | | | PrintSet | PaperSize | |
| | | Color | | | | ColorInfo | |
| | | | | | ⋮ | | |

TECHNIQUE OF RELAYING COMMUNICATION BETWEEN IMAGE FORMING APPARATUS AND SERVER

This application is based on Japanese Patent Application No. 2014-007649 filed with the Japan Patent Office on Jan. 20, 2014, the entire content of which is hereby incorporated by reference.

BACKGROUND OF THE INVENTION

1. Field of the Invention

This disclosure relates to a technique of relaying communication between an image forming apparatus and a server, and more particularly to a technique of relaying communication between an image forming apparatus and a server by using a relay device.

2. Description of the Related Art

As image forming apparatuses such as MFPs (Multi-Functional Peripherals) incorporate more functions, it has become possible to utilize an application function in an image forming apparatus. An image forming apparatus capable of accessing an application stored in a server and capturing a processing result obtained by execution of this application has also been proposed.

Some image forming apparatuses have a function of communicating directly with a server providing an application. However, in view of security and absorption of the difference in protocol between them, the communication may be conducted through a relay device configured to relay communication.

Such communication between an image forming apparatus and a server providing an application through a relay device is problematic because a communication time is extended as compared to when the image forming apparatus and the server communicate directly with each other.

SUMMARY OF THE INVENTION

An object of this disclosure is to provide an image processing system capable of reducing a delay in communication between an image forming apparatus and a server. Another object of this disclosure is to provide a relay device included in the image processing system capable of reducing a delay in communication between the image forming apparatus and the server. Another object of this disclosure is to provide the image forming apparatus included in the image processing system capable of reducing a delay in communication between the image forming apparatus and the server. Another object of this disclosure is to provide a relay method in the image processing system capable of reducing a delay in communication between the image forming apparatus and the server.

In accordance with an embodiment, an image processing system includes an image forming apparatus, a server capable of executing an application in response to a request from the image forming apparatus and providing a result of the execution to the image forming apparatus, and a relay device configured to relay an exchange between the image forming apparatus and the server, the exchange including a request for the application from the image forming apparatus to the server, and a response to the request from the server to the image forming apparatus. A memory of the relay device includes an area configured to cache the response from the server. This image processing system further includes a first transmission module configured to, when the relay device accepts the request from the image forming apparatus, read the response which has been cached in the memory, and transmit the read response to the image forming apparatus as a formal response prior to accepting an actual response to the request from the server.

Preferably, the image processing system further includes a module configured to compare the formal response and the actual response to determine whether the formal response matches the actual response or not, and a second transmission module configured to, when it is determined that the formal response does not match the actual response, transmit a response in accordance with the actual response to the image forming apparatus as a response to a subsequent request from the image forming apparatus.

More preferably, the second transmission module transmits a response including a parameter in accordance with the actual response to the image forming apparatus, as the response to the subsequent request from the image forming apparatus.

Preferably, the image processing system further includes a generation module configured to, when it is determined that an attribute of the actual response is different from an attribute of the formal response, in the relay device, generate a replacement command by converting an attribute of the subsequent request from the image forming apparatus, and replace the request from the image forming apparatus to be relayed to the server by the replacement command. The second transmission module transmits a response to the replacement command from the server to the image forming apparatus as the response to the subsequent request from the image forming apparatus.

More preferably, when a parameter of the actual response is different from a parameter of the formal response, the generation module generates the replacement command by replacing a parameter included in the subsequent request from the image forming apparatus by a parameter in accordance with relation with the parameter of the actual response.

Preferably, when a protocol of the actual response is different from a protocol of the formal response, the generation module generates the replacement command by replacing the subsequent request from the image forming apparatus in accordance with relation between the protocol of the actual response and the protocol of the formal response.

More preferably, the generation module reads the replacement command in accordance with relation between the attribute of the actual response and the attribute of the formal response from a memory, the memory storing a correspondence between the request from the image forming apparatus and the replacement command in accordance with the relation between the attribute of the actual response and the attribute of the formal response.

More preferably, the memory of the relay device includes an area configured to store the correspondence obtained from another relay device included in the image processing system.

Preferably, the image processing system further includes a module configured to display an operation screen of the image forming apparatus on the relay device, and a module configured to transfer an operation signal in accordance with user operation on the operation screen from the relay device to the image forming apparatus. The relay device is configured to accept the user operation on the operation screen as the request from the image forming apparatus.

In accordance with another embodiment, a relay device is configured to relay an exchange between an image forming apparatus and a server capable of executing an application in response to a request from the image forming apparatus and providing a result of the execution to the image forming apparatus, the exchange including a request for the application from the image forming apparatus to the server, and a response to the request from the server to the image forming apparatus. A memory of the relay device includes an area configured to cache the response from the server. The relay device includes a module configured to, upon accepting the request from the image forming apparatus, read the response to the request which has been cached in the memory, and transmit the read response to the image forming apparatus as a formal response prior to accepting an actual response to the request from the server.

Preferably, the relay device further includes a module configured to compare the formal response and the actual response to determine whether the formal response matches the actual response or not, and a module configured to, when it is determined that the formal response does not match the actual response, transmit a response in accordance with the actual response to the image forming apparatus as a response to a subsequent request from the image forming apparatus.

In accordance with another embodiment, an image forming apparatus incorporates the relay device described above.

In accordance with another embodiment, a relay method is a method of relaying by a relay device an exchange between an image forming apparatus and a server capable of executing an application in response to a request from the image forming apparatus and providing a result of the execution to the image forming apparatus, the exchange including a request for the application from the image forming apparatus to the server, and a response to the request from the server to the image forming apparatus. This relay method includes, accepting, by the relay device, the request from the image forming apparatus, reading, by the relay device, the response to the request which has been cached in the memory, transmitting, by the relay device, the read response to the image forming apparatus as a formal response prior to accepting an actual response to the request from the server, and cashing the actual response in the memory as a response to the request.

Preferably, the relay method further includes, when there was a formal response to a previous request from the image forming apparatus that did not match an actual response during the same session, replacing, by the relay device, a parameter included in the response to the request which has been cached in the memory based on the difference between the formal response and the actual response. The transmitting of the response to the image forming apparatus includes transmitting a response in which the parameter has been replaced to the image forming apparatus.

More preferably, the relay method further includes, when there was a formal response to a previous request from the image forming apparatus that had an attribute that did not match an attribute of an actual response during the same session, converting, by the relay device, the request received from the image forming apparatus in the step of accepting the request based on the difference between the formal response and the actual response, and transmitting the converted request to the server, and accepting, by the relay device, a response to the converted request from the server, and transmitting the response to the image forming apparatus.

In accordance with another embodiment, a non-transitory computer-readable storage medium stores a program for causing a computer to perform a process of relaying an exchange between an image forming apparatus and a server capable of executing an application in response to a request from the image forming apparatus and providing a result of the execution to the image forming apparatus, the exchange including a request for the application from the image forming apparatus to the server, and a response to the request from the server to the image forming apparatus. This program causes the computer to perform, upon accepting the request from the image forming apparatus, reading the response to the request which has been cached in the memory, transmitting the read response to the image forming apparatus as a formal response prior to accepting an actual response to the request from the server, and cashing the actual response in the memory as a response to the request.

Preferably, the program further causes the computer to perform determining whether there was a formal response to a previous request from the image forming apparatus that did not match an actual response during the same session, and when it is determined that there was a formal response that did not match an actual response, replacing a parameter included in the response to the request which has been cached in the memory based on the difference between the formal response and the actual response. The transmitting of the response to the image forming apparatus includes transmitting a response in which the parameter has been replaced to the image forming apparatus.

More preferably, the program further causes the computer to perform, when it is determined that there was a formal response to a previous request from the image forming apparatus that had an attribute that did not match an attribute of an actual response during the same session, converting the request received from the image forming apparatus in the step of accepting the request based on the difference between the formal response and the actual response, transmitting the request converted in the converting step to the server, and accepting a response to the converted request from the server, and transmitting the response to the image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5 and 6 are diagrams illustrating specific examples of databases for generating a replacement command, respectively.

DESCRIPTION OF THE PREFERRED EMBODIMENTS

Embodiments of the present invention will be described below with reference to the drawings. In the following description, the same parts and components are designated with the same reference signs. Their names and functions are also identical. Thus, descriptions thereof will not be repeated.

<System Configuration>

Figure 1:
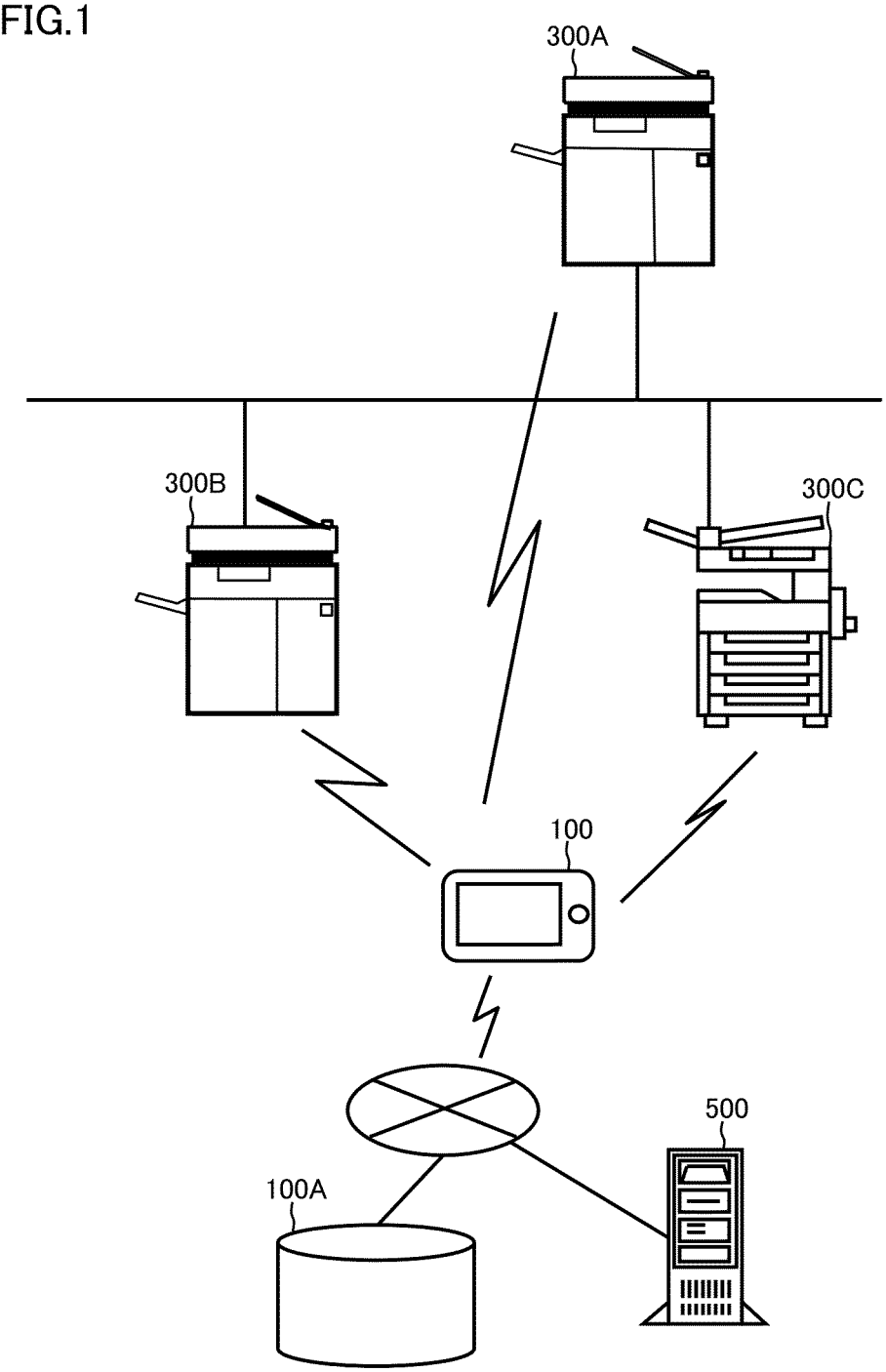
FIG. 1 is a diagram illustrating a specific example of a configuration of an image processing system (hereinafter abbreviated as a "system") according to an embodiment.

FIG. 1 is a diagram illustrating an example of a configuration of an image processing system (hereinafter abbreviated as a "system") according to this embodiment. Referring to FIG. 1, this system includes at least one of MFPs 300A, 300B and 300C as an example of an image forming apparatus. MFPs 300A, 300B and 300C are also collectively referred to as an MFP 300.

MFP 300 can communicate with a relay device 100. Preferably, MFP 300 communicates wirelessly with relay device 100.

Relay device 100 may be any type of device as long as it can communicate with MFP 300 and also with a server 500 which will be described later. Relay device 100 is, for example, a terminal device also referred to as a tablet. Relay device 100 does not need to be a device separate from MFP 300, and may be incorporated in any one of MFPs 300.

The communication between relay device 100 and server 500 may be conducted through a network such as the Internet, or may be conducted directly. In addition, the communication may be wireless or wired.

Relay device 100 can further access a memory device 100A. Memory device 100A may also be a device separate from relay device 100 and accessible via communication through a network such as the Internet, or may be incorporated in relay device 100.

<Device Configuration>

Figure 2:
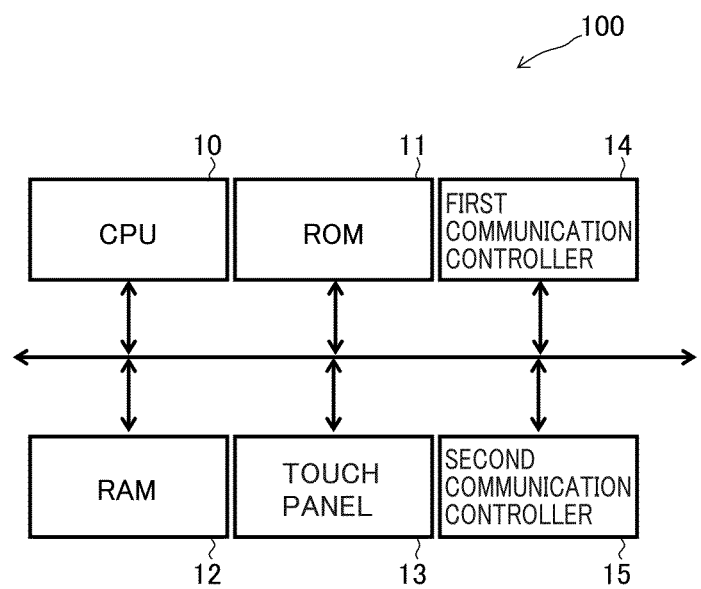
FIG. 2 is a block diagram illustrating a specific example of a device configuration of a relay device included in the system.

FIG. 2 is a block diagram illustrating an example of a device configuration of relay device 100. FIG. 2 shows an example where relay device 100 is implemented as a terminal device. Thus, the device configuration of relay device 100 is obviously not limited to that shown in FIG. 2.

Referring to FIG. 2, relay device 100 includes a CPU (Central Processing Unit) 10 configured to control the entire device. Relay device 100 also includes a ROM (Read Only Memory) 11 configured to store programs to be executed in CPU 10 and other data, and a RAM (Random Access Memory) 12 configured to store calculation values and serving as a work area during execution of the programs in CPU 10. Relay device 100 further includes a touch panel 13, a first communication controller 14, and a second communication controller 15. First communication controller 14 controls the communication with MFP 300. Second communication controller 15 controls the communication with server 500 and memory device 100A.

<Operation Overview>

Relay device 100 relays the communication between MFP 300 and server 500. Server 500 stores an application and executes the application in response to a request from MFP 300. Then, server 500 provides a processing result of the application to MFP 300 as a response to this request. In this manner, MFP 300 can utilize the application of server 500. Relay device 100 relays the transmission of the request from MFP 300 to server 500, and the transmission of the response from server 500 to MFP 300. In so doing, relay device 100 associates the response from server 500 with the request from MFP 300 and caches (stores) the response in memory device 100A.

Relay device 100 may be any type of device as long as it can communicate with MFP 300 and server 500 as described above. Relay device 100 is, for example, a terminal device also referred to as a tablet. The terminal device may also have the function of a so-called remote panel. Specifically, the terminal device incorporates an application for implementing the function of a remote panel. The terminal device executes this application to display an operation screen of specified MFP 300 on the touch panel. Upon accepting user operation (touch) on the operation screen, the terminal device transmits information indicating an operation position to MFP 300. Then, the terminal device updates the operation screen on the touch panel depending on processing in MFP 300 according to operation in this operation position. MFP 300 specifies an instructed process based on the operation panel displayed on the terminal device and the information indicating the operation position, and executes the process. In this manner, a user of the terminal device can remotely control MFP 300 by performing operation on the touch panel of the terminal device.

If relay device 100 is implemented as the terminal device described above, a request from MFP 300 which will be described later may be input to relay device 100 by user operation on the operation screen of MFP 300 displayed on the touch panel of relay device 100.

Figure 3:
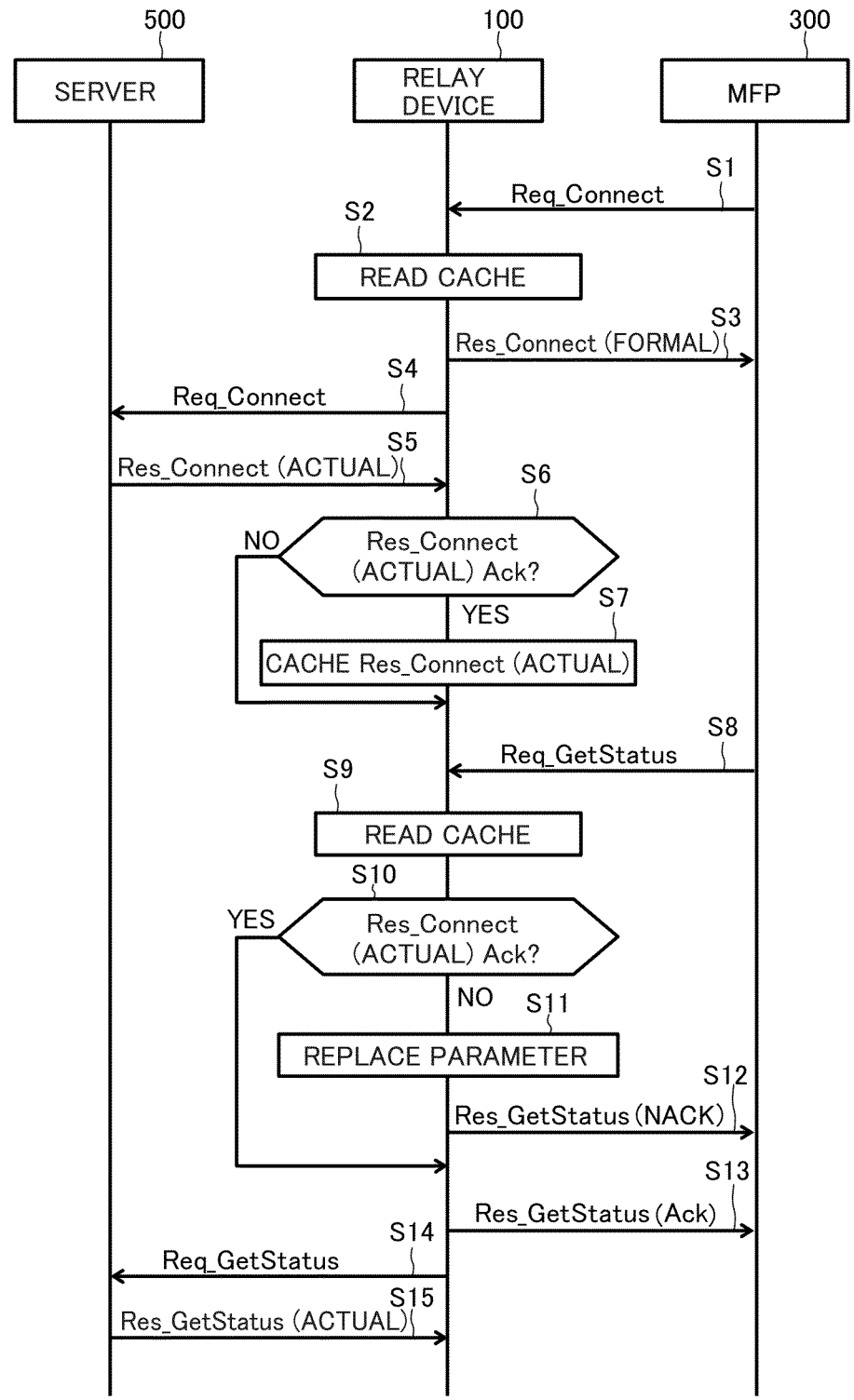
FIGS. 3 and 4 are diagrams illustrating an operation overview of the system, respectively.

FIG. 3 is a diagram illustrating an operation overview of this system. Referring to FIG. 3, when relay device 100 accepts a request from MFP 300 to server 500 (step S1), relay device 100 reads a response associated with this request from memory device 100A (step S2). Then, relay device 100 transmits the read response to MFP 300 prior to accepting a response from server 500 (step S3). In the following description, the response read from memory device 100A is also referred to as a formal response, and the response received from server 500 is also referred to as an actual response. If a response associated with the above request has not been cached in memory device 100A, step S3 is skipped.

In the example of FIG. 3, in step S1, relay device 100 accepts a request "Req_Connect," which is a request for connection to server 500, from MFP 300. In step S2, in response to this request, relay device 100 reads a response "Res_Connect," which has been previously received from server 500 and cached in memory device 100A, from memory device 100A. Then, in step S3, relay device 100 transmits a formal response "Res_Connect (formal)" to MFP 300.

Preferably, relay device 100 then outputs the request received from MFP 300 in step S1 to server 500 (step S4). Then, relay device 100 accepts an actual response to this request from server 500 (step S5). In the example of FIG. 3, in step S5, relay device 100 receives an actual response "Res_Connect (actual)" from server 500.

Relay device 100 compares the actual response and the formal response to determine whether they match each other or not (step S6). In the example of FIG. 3, since the formal response "Res_Connect (formal)" indicating that a connection had been made in response to the connection request was transmitted to MFP 300 in step S3, relay device 100 determines in step S6 whether the actual response from server 500 is a response indicating that a connection has been made.

If it is determined so, that is, if the actual response and the formal response match each other (YES in step S6), relay device 100 associates the actual response with the above request and caches the response in memory device 100A (step S7). If a response associated with the above request has already been cached in memory device 100A, relay device 100 overwrites the memory in step S7.

Then, when relay device 100 accepts a request from MFP 300 (step S8), relay device 100 similarly reads a response associated with this request from memory device 100A (step S9). If this request is a second or subsequent request during the same session, relay device 100 determines whether there was a formal response to a request that did not match an actual response during this session (step S10). In the example of FIG. 3, relay device 100 determines whether the actual response was a response indicating that a connection had been made.

If the result is that there was a formal response that did not match an actual response during this session (NO in step S10), relay device 100 replaces a parameter included in the response that was read from memory device 100A in step S9 by a parameter in accordance with the above actual response (step S11). Then, relay device 100 transmits a response in which the parameter has been replaced to MFP 300 (step S12).

In the example of FIG. 3, when relay device 100 accepts a second request "Req_GetStatus" for a current state from MFP 300 to server 500, if the previous actual response "Res_Connect (actual)" was a response indicating that a connection had not been made, relay device 100 determines in step S10 that there was a formal response that did not match an actual response. In this case, in step S11, relay device 100 replaces a parameter (Ack) of a response "Res_GetStatus (Ack)" indicating a connected state, which has been cached as a response to the request "Req_GetStatus," by a parameter (NACK) indicating a non-connected state in accordance with the actual response. Then, in step S12, relay device 100 transmits a response "Res_GetStatus (NACK)" in which the parameter has been replaced to MFP 300.

If there was no formal response to a request that did not match an actual response during this session (YES in step S10), relay device 100 operates in a manner similar to above. Specifically, relay device 100 transmits a cached response to MFP 300 as a formal response (step S13). Relay device 100 then transmits the request to server 500 (step S14) and obtains a response to the request (step S15). The same operation is repeated thereafter.

FIG. 3 illustrates operation when server 500 and MFP 300 have the same protocol. In this case, due to the above-described operation performed by this system, a response is returned to MFP 300 prior to the communication with server 500 if the formal response matches the actual response. This allows MFP 300 to swiftly move on to the next operation. Usually, if the protocols are the same, most commands can utilize cached (previous) responses at a command level. Consequently, a communication time can be significantly shortened to allow the user of MFP 300 to swiftly perform panel operation. Preferably, this system compares a formal response and an actual response and operates based on a result of the comparison, so that even if the formal response is different from the actual response, the system can be operated to quickly notify MFP 300 of that state and end the processing normally.

However, when server 500 and MFP 300 have different protocols (or different versions of a protocol) or when a parameter has been changed in server 500, the cached (previous) response may not be used.

Figure 4:
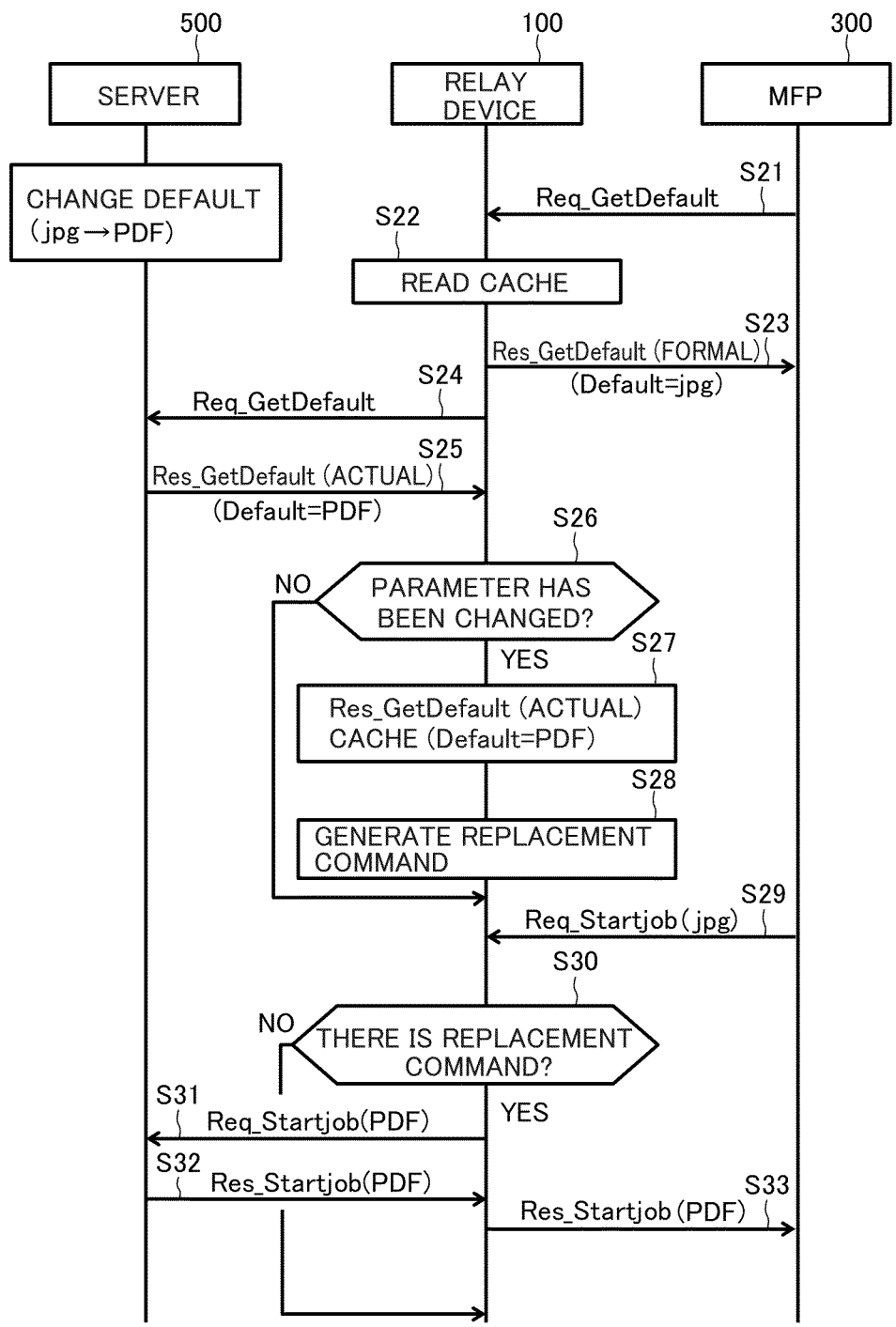

FIG. 4 is a diagram illustrating an operation overview of this system when a parameter has been changed in server 500. FIG. 4 shows an example where a parameter, which was "jpg" when a response was cached, has been changed to "PDF" in server 500.

Referring to FIG. 4, when relay device 100 accepts a request from MFP 300 to server 500 (step S21), relay device 100 reads a response associated with this request from memory device 100A (step S22). Then, relay device 100 transmits the read response to MFP 300 prior to accepting a response from server 500 (step S23). In the example of FIG. 4, in step S21, relay device 100 accepts a request "Req_GetDefault," which is a request for a default state to server 500, from MFP 300. Then, in step S22, in response to this request, relay device 100 reads a response "Res_GetDefault (Default=jpg)," which has been previously received from server 500 and cached in memory device 100A, from memory device 100A. Then, in step S23, relay device 100 transmits a formal response "Res_GetDefault (Default=jpg) (formal)" to MFP 300.

Next, relay device 100 outputs the request received from MFP 300 in step S21 to server 500 (step S24). Then, relay device 100 receives an actual response to this request from server 500 (step S25). In the example of FIG. 4, in step S25, relay device 100 receives an actual response "Res_GetDefault (Default=PDF) (actual)" from server 500.

Relay device 100 can determine, by comparing the actual response and the formal response, that a parameter included in the actual response has been changed from a parameter included in the formal response (YES in step S26) In this case, relay device 100 associates the actual response "Res_GetDefault (Default=PDF) (actual)" with the above request "Req_GetDefault" and caches the response in memory device 100A (step S27). Further, relay device 100 generates a command by converting a subsequent request from MFP 300 in advance based on the difference in parameter, and replaces the request from MFP 300 to be relayed to server 500 by the command (step S28). The converted command is hereinafter also referred to as a replacement command. Relay device 100 temporarily stores the generated replacement command in the memory until a corresponding request is received from MFP 300.

Then, when relay device 100 accepts a request from MFP 300 (step S29), relay device 100 determines whether this request is the one for which the replacement command was generated in step S28 (step S30).

If the accepted request is the request with the replacement command (YES in step S30), relay device 100 transmits the replacement command corresponding to this request to server 500, to relay the request (step S31). Then, relay device 100 receives a response from server 500 (step S32) and transmits the response to MFP 300 (step S33).

In the example of FIG. 4, the parameter (jpg) of the formal response has been changed to the parameter (PDF) of the actual response received in step S25. Thus, relay device 100 generates the replacement command in step S28. Here, relay device 100 utilizes a database that defines a correspondence between the request and the replacement command. This database may be stored in a memory such as ROM 11, or may be stored in another memory device in a manner similar to the cached response.

FIGS. 5 and 6 are diagrams illustrating examples of databases for generating replacement commands. FIG. 5 illustrates an example of a database for generating a replacement command in response to a change in parameter. FIG. 6 illustrates an example of a database for generating a replacement command when the protocols are different. Specifically, referring to FIG. 5, for relay device 100, an actual response (command) in which a parameter has been changed from a parameter included in a formal response, and a request to replace the parameter by the parameter included in the actual response in response to a subsequent request are defined in advance. In the example of FIG. 5, for instance, it is specified that, if a parameter included in an actual response which is a command "GetDefault" has been changed from a parameter included in a corresponding formal response, the parameter is to be replaced by the parameter of the actual response for transmission to server 500 in response to a request which is a command "StartJob" or "SendJob." Preferably, as shown in FIG. 5, a request to replace the parameter is defined for each protocol.

Referring to FIG. 6, for relay device 100, if an actual response from server 500 and a formal response have different protocols, that is, if server 500 and MFP 300 have different communication protocols, a correspondence between these protocols on every command is defined in advance. In the example of FIG. 6, for instance, if one of the protocols is a version 1.0 of an API (application programming interface) protocol and the other is a version 1.0 of a TCP (transmission control protocol), it is specified that a command "ScanSetting" of the API is to be replaced by a command "ScanSet" to generate a replacement command. Further, in the database of FIG. 6, a correspondence between commands of different versions of the same protocol may be defined.

Preferably, the databases of FIGS. 5 and 6 are stored in a memory of relay device 100. Alternatively, these databases are associated with relay device 100 and stored in an external device. Relay device 100 can exchange these databases with another relay device. That is, preferably, relay device 100 obtains a database from another relay device or a database associated with another relay device, and updates the database stored in its own memory.

In the example of FIG. 4, relay device 100 refers to the database of FIG. 5 in step S28. Then, since the parameter has been changed in the command "GetDefault," relay device 100 generates a replacement command "StartJob (PDF)" in which the parameter jpg of a command "StartJob (jpg)" has been replaced by the parameter PDF, for example, and stores the command in the memory. Then, when relay device 100 accepts the request "Req_GetDefault" from MFP 300, relay device 100 determines that there is the replacement command "StartJob (PDF)" in step S30, and thus transmits this replacement command to server 500 in step S31.

If the actual response from server 500 and the formal response have different protocols, that is, if server 500 and MFP 300 have different communication protocols, this system operates in a manner similar to that shown in FIG. 4. Specifically, if it is determined that there is a difference in protocol as a result of comparison between a formal response and an actual response, relay device 100 generates a replacement command in which the protocol has been converted by reference to the database of FIG. 6. Then, relay device 100 replaces a request from MFP 300 by the replacement command and transmits the replacement command to server 500.

Due to the above-described operation performed by this system, even if the formal response and the actual response have different parameters, or different protocols or different versions of a protocol, the difference is absorbed by relay device 100. Then, smooth and rapid communication is implemented between server 500 and MFP 300. As a result, the user of MFP 300 can swiftly perform panel operation.

<Functional Configuration>

Figure 7:
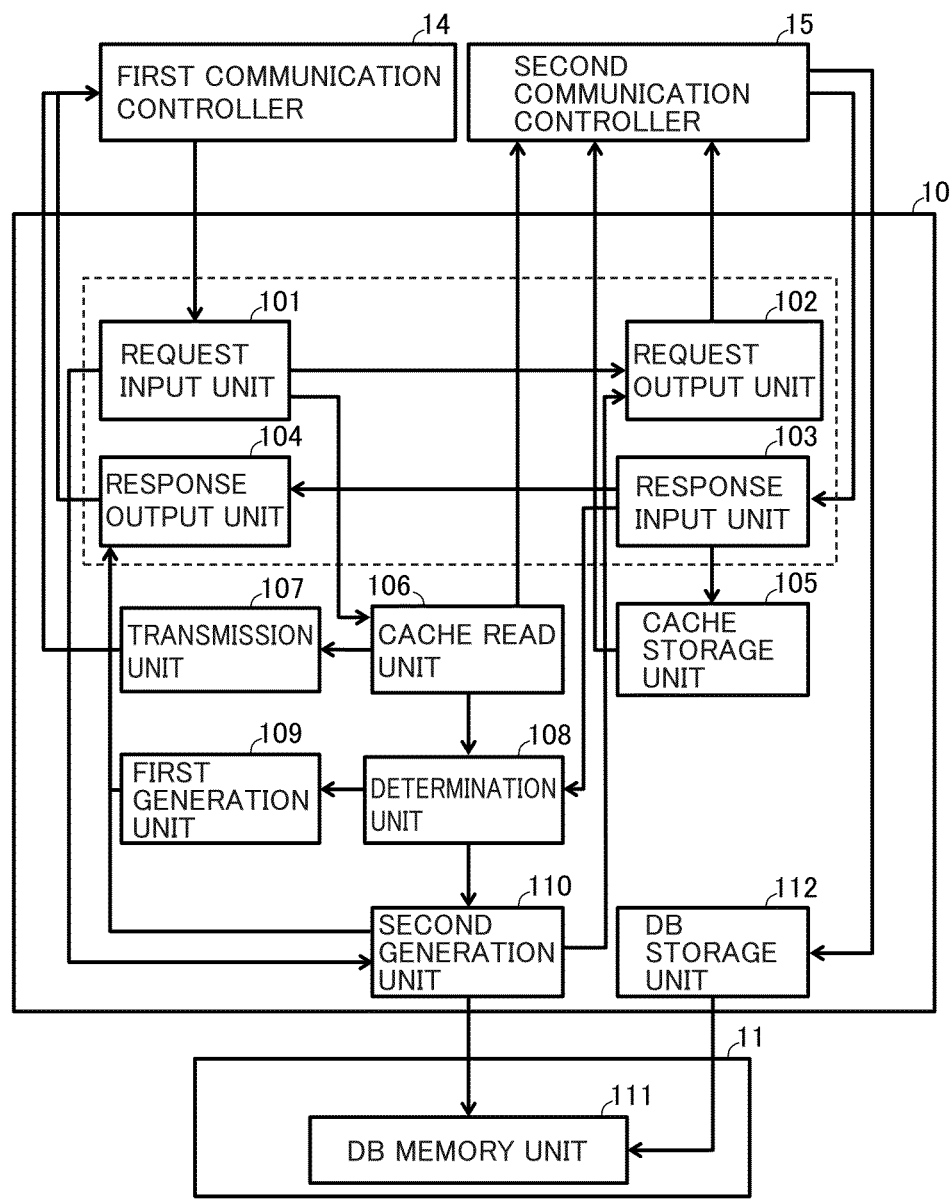
FIG. 7 is a block diagram illustrating a specific example of a functional configuration of the relay device.

FIG. 7 is a block diagram illustrating an example of a functional configuration of relay device 100 for performing the above-described operation. Each function in FIG. 7 is implemented mainly by CPU 10 of relay device 100, which reads the programs stored in ROM 11 onto RAM 12 and executes them. However, at least some of the functions may be implemented by hardware shown in FIG. 2, or other hardware such as an electric circuit (not shown).

Referring to FIG. 7, ROM 11 includes a database (DB) memory unit 111 which serves as a memory area for storing the databases for generating the replacement commands as shown in FIGS. 5 and 6.

Referring further to FIG. 7, CPU 10 includes, as the function of relaying communication between MFP 300 and server 500, a request input unit 101, a request output unit 102, a response input unit 103, and a response output unit 104.

Request input unit 101 accepts input of a request from MFP 300 to server 500 through first communication controller 14. Request output unit 102 outputs the request from MFP 300 to server 500 through second communication controller 15. Response input unit 103 accepts input of a response from server 500 to MFP 300 through second communication controller 15. Response output unit 104 outputs the response from server 500 to MFP 300 through first communication controller 14.

CPU 10 further includes a cache storage unit 105, a cache read unit 106, and a transmission unit 107.

Cache storage unit 105 associates a response from server 500 with a request and caches the response in memory device 100A. Cache read unit 106 reads an associated response from memory device 100A in response to a request received from MFP 300. Transmission unit 107 transmits the response read from memory device 100A as a formal response to MFP 300 through first communication controller 14.

Preferably, CPU 10 further includes a determination unit 108, a first generation unit 109, and a second generation unit 110.

Determination unit 108 compares a formal response and an actual response to determine whether they match each other or not. If determination unit 108 determines that they do not match each other, first generation unit 109 generates, in order to transmit a response in accordance with the actual response to MFP 300 in response to a subsequent request from MFP 300, a response including a parameter in accordance with the actual response, that is, a response in which the parameter included in a response read from memory device 100A has been replaced with the parameter of the actual response. If the formal response and the actual response have different attributes such as different parameters, or different protocols or different versions of a protocol, second generation unit 110 generates, in order to replace a subsequent request from MFP 300, a replacement command by converting the attribute of the request by reference to the database stored in DB memory unit 111.

Preferably, if the actual response and the formal response have different parameters, second generation unit 110 generates a replacement command by replacing the parameter included in a subsequent request from MFP 300 by the parameter in accordance with relation with the parameter of the actual response by reference to the database of FIG. 5. Preferably, if the actual response and the formal response have different protocols, second generation unit 110 generates a replacement command by replacing a subsequent request from MFP 300 in accordance with relation between the protocol of the actual response and the protocol of the formal response by reference to the database of FIG. 6.

Preferably, CPU 10 further includes a DB storage unit 112 configured to obtain the databases as shown in FIGS. 5 and 6 associated with another relay device from another device and store them in DB memory unit 111.

<Operation Flow>

Figure 8:
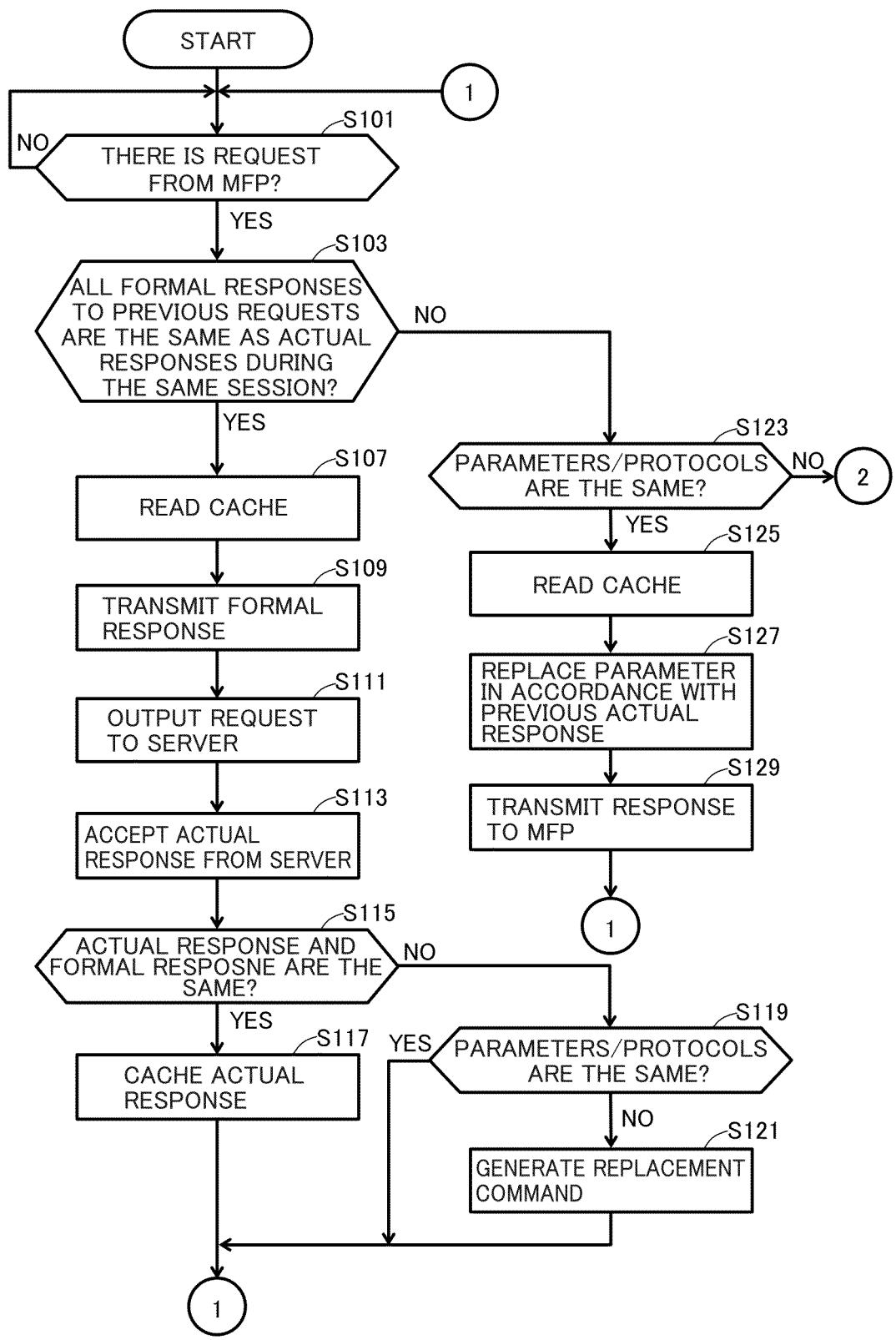
FIGS. 8 and 9 are flowcharts illustrating a specific example of a flow of operation of the relay device.
Figure 9:
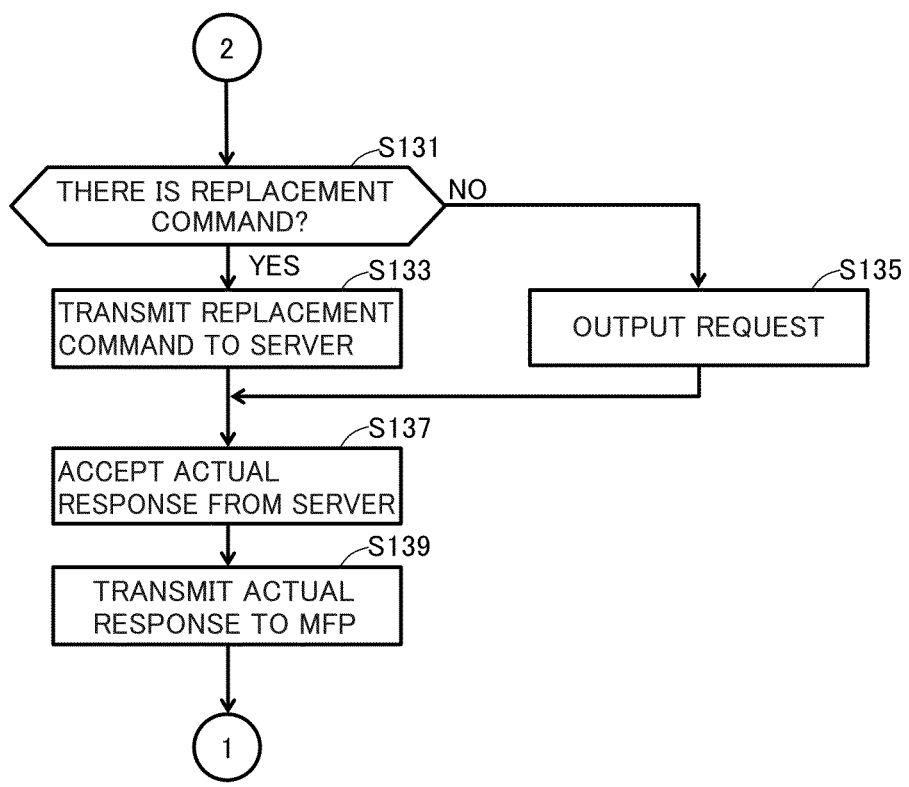

FIGS. 8 and 9 are flowcharts illustrating an example of a flow of operation of relay device 100. The operation shown in the flowcharts of FIGS. 8 and 9 is implemented by CPU 10 of relay device 100, which reads the programs stored in ROM 11 onto RAM 12 and executes them to perform each function shown in FIG. 7.

Referring to FIG. 8, when CPU 10 accepts a request from MFP 300 to server 500 (YES in step S101), CPU 10 reads a response associated with this request and cached in memory device 100A (steps S107 and S125). If there is no corresponding cache in memory device 100A, CPU 10 directly transfers the request from MFP 300 and a response from server 500 in a manner similar to a normal relay device.

Preferably, upon accepting the request from MFP 300, CPU 10 determines whether there was a formal response to a previous request from MFP 300 that did not match an actual response during this session between MFP 300 and server 500 (step S103). If the result is that there was no formal response that did not match an actual response (YES in step S103), that is, if all the formal responses matched the actual responses, CPU 10 reads a cached response in step S107, and transmits this response to MFP 300 as a formal response prior to accepting an actual response to the request from the server in the subsequent operation (step S109). Then, CPU 10 transmits the request from MFP 300 to server 500 (step S111), and accepts an actual response from server 500 (step S113). If the actual response is the same as the formal response (YES in step S115), CPU 10 caches the actual response in memory device 100A as a response to the above request (step S117).

If the actual response accepted in step S103 does not match the formal response transmitted to MFP 300 in step S109, and if the responses had different attributes such as protocols (NO in S119), CPU 10 generates a replacement command by converting the attribute based on the difference between the formal response and the actual response by reference to the database of FIG. 6 (step S121). The generated replacement command is temporarily stored in the memory. CPU 10 then returns to the first operation and waits for the next request from MFP 300.

On the other hand, if there was a formal response that did not match an actual response during this session (NO in step S103), and if the attribute such as the protocol of the formal response matched that of the actual response (YES in step S123), CPU 10 replaces the parameter included in the response to the request accepted in step S101 which has been cached in the memory based on the difference between the formal response and the actual response (step S127). CPU 10 transmits a response in which the parameter has been replaced to MFP 300 (step S129). CPU 10 then returns to the first operation and waits for the next request from MFP 300.

If there was a formal response that did not match an actual response during this session (NO in step S103), and if the attribute such as the protocol of the formal response did not match that of the actual response (NO in step S123), referring to FIG. 9, CPU 10 determines whether the replacement command for the request received from MFP 300 in step S101 has been stored in the memory (S131). If the request received from MFP 300 in step S101 is a request for which a replacement command has been stored (YES in step S131), CPU 10 transmits the replacement command to server 500 (step S133) to replace the request from MFP 300 by the replacement command. If a replacement command has not been stored (NO in step S131), CPU 10 transmits the request from MFP 300 to server 500 (step S135).

When CPU 10 accepts an actual response from server 500 (step S137), CPU 10 transmits this actual response to MFP 300 (step S139) CPU 10 then returns to the first operation and waits for the next request from MFP 300.

<Effects of Embodiments>

Due to the configuration and operation of this system as described above, in response to a request from MFP 300 to server 500, a formal response is first returned to MFP 300 by use of a previously cached response. A communication speed can thus be increased.

Furthermore, even if the formal response is different from the actual response, the communication between MFP 300 and server 500 is not interrupted since the formal response is first returned to MFP 300. In this case, a response in which the change in parameter or attribute between the formal response and the actual response has been corrected is returned to MFP 300 in response to a subsequent request. Thus, the change in parameter or the difference in attribute such as protocol can be absorbed while the communication is continued.

Therefore, this system can increase the communication speed between MFP 300 and server 500 as compared to that of relay communication using a normal relay device, thereby enhancing convenience for the user of MFP 300.

<Other Examples>

As described above, relay device 100 can be implemented by processing in a terminal device such as a so-called tablet, or in CPU 30 incorporated in MFP 300. Thus, a program for causing these CPUs to perform the above-described operation can also be provided. By providing the program, a terminal such as an existing tablet or CPU 30 of MFP 300 can function as relay device 100. Consequently, this system can be readily configured using an existing device.

Such a program can be recorded on a computer-readable recording medium such as a flexible disk attached to the computer, a CD-ROM (Compact Disk-Read Only Memory), a ROM, a RAM, and a memory card, and thus, provided as a program product. Alternatively, the program recorded on a recording medium such as a hard disk incorporated in a computer can be provided. Furthermore, the program can also be provided by download via a network.

In addition, the program according to the present invention may cause the process to be executed by invoking a required module in a prescribed arrangement at a prescribed timing from program modules provided as part of the operating system (OS) of the computer. In this case, the program itself does not include the above-described modules but cooperates with the OS to execute the process. The program not including the above-described modules may also be included in the program according to the present invention.

Furthermore, the program according to the present invention incorporated in a part of another program may be provided. Also in such a case, the program itself does not include any modules included in the above-described another program, but cooperates with another program to execute the process. The program incorporated in another program as described above may also be included in the program according to the present invention.

The program product to be provided is installed in a program storage unit such as a hard disk for execution. It is to be noted that the program product includes a program itself and a recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
   an image forming apparatus configured to transmit a request pertaining to an execution of an application function;
   a server configured (i) to execute an application function upon receiving the request from said image forming apparatus and (ii) transmit a response providing a result of the execution to said image forming apparatus; and
   a relay device, comprising a memory and a processor, configured to relay an exchange between said image forming apparatus and said server, said exchange including the request from said image forming apparatus to said server, and the response to said request from said server to said image forming apparatus, wherein the memory of said relay device comprises an area configured to cache said response from said server, wherein the relay device is further configured to:
   receive said request, from said image forming apparatus, the request pertaining to the execution of the application function of the server, read a response, corresponding to said request, that was previously cached in said memory, and transmit the read response to said image forming apparatus as a relay response, transmit the request to the server, subsequent to the transmission of the relay response to the imaqe forming apparatus, and receive a server response correspondinq to the request transmitted to the server.

2. The image processing system according to claim 1, further comprising:

a module of the relay device configured to compare said relay response cached in said memory of said relay device and said server response received from said server to determine whether said relay response matches said server response or not, and a second transmission module configured to, when it is determined that said relay response does not match said server response, transmit a response in accordance with said server response to said image forming apparatus as a response to a subsequent request from said image forming apparatus.

3. The image processing system according to claim 2, wherein said second transmission module transmits a response including a parameter in accordance with said server response to said image forming apparatus, as the response to the subsequent request from said image forming apparatus.

4. The image processing system according to claim 2, further comprising a generation module configured to, when it is determined that an attribute of said server response is different from an attribute of said relay response, in said relay device, generate a replacement command by converting an attribute of the subsequent request from said image forming apparatus, and replace the request from said image forming apparatus to be relayed to said server by said replacement command, wherein said second transmission module transmits a response to said replacement command from said server to said image forming apparatus, as the response to the subsequent request from said image forming apparatus.

5. The image processing system according to claim 4, wherein when a parameter of said server response is different from a parameter of said relay response, said generation module generates said replacement command by replacing a parameter included in the subsequent request from said image forming apparatus by a parameter in accordance with relation with the parameter of said server response.

6. The image processing system according to claim 5, wherein said generation module reads said replacement command in accordance with relation between the attribute of said server response and the attribute of said relay response from a memory, said memory storing a correspondence between the request from said image forming apparatus and said replacement command in accordance with the relation between the attribute of said server response and the attribute of said relay response.

7. The image processing system according to claim 6, wherein said memory of said relay device includes an area configured to store said correspondence obtained from another relay device included in said image processing system.

8. The image processing system according to claim 4, wherein when a protocol of said server response is different from a protocol of said relay response, said generation module generates said replacement command by replacing the subsequent request from said image forming apparatus in accordance with relation between the protocol of said server response and the protocol of said relay response.

9. The image processing system according to claim 8, wherein said generation module reads said replacement command in accordance with relation between the attribute of said server response and the attribute of said relay response from a memory, said memory storing a correspondence between the request from said image forming apparatus and said replacement command in accordance with the relation between the attribute of said server response and the attribute of said relay response.

10. The image processing system according to claim 9, wherein said memory of said relay device includes an area configured to store said correspondence obtained from another relay device included in said image processing system.

11. The image processing system according to claim 1, further comprising:

a module configured to display an operation screen of said image forming apparatus on said relay device; and a module configured to transfer an operation signal in accordance with user operation on said operation screen from said relay device to said image forming apparatus, wherein said relay device is configured to accept the user operation on said operation screen as said request from said image forming apparatus.

12. A relay device comprising:

a processor configured to relay an exchange between an image forming apparatus and a server capable of executing an application function in response to a request from said image forming apparatus and providing a result of the execution to said image forming apparatus, said exchange including a request for execution of said application function from said image forming apparatus to said server, and a response to said request from said server to said image forming apparatus, a memory of said relay device including an area configured to cache said response from said server, said processor of said relay device comprising a module configured to, upon accepting said request from said image forming apparatus, read a response corresponding to said request which was previously cached in said memory, transmit the read response to said image forming apparatus as a relay response, transmit the request to the server, subsequent to the transmission of the relay response, and accept a server response to said request from said server.

13. The relay device according to claim 12, further comprising:

a module configured to compare said relay response cached in said memory of said relay device and said server response to determine whether said relay response matches said server response or not; and a module configured to, when it is determined that said relay response does not match said server response, transmit the relay response in accordance with said server response to said image forming apparatus as a response to a subsequent request from said image forming apparatus.

14. An image forming apparatus incorporating the relay device according to claim 12.

15. A relay method of relaying by a relay device an exchange between an image forming apparatus and a server capable of executing an application function in response to a request from said image forming apparatus and providing a result of the execution to said image forming apparatus, said exchange including a request from said image forming apparatus to said server, and a response to said request from said server to said image forming apparatus, comprising:
  accepting, by said relay device, said request from said image forming apparatus;
  reading, by said relay device, a response to said request which was previously cached in a memory;
  transmitting, by said relay device, the read response to said image forming apparatus as a relay response,
  transmitting, by said relay device and to said server, the request, subsequent to the transmission of the relay response to the image forming apparatus,
  accepting a server response, responsive to said request, from said server; and
  caching said server response in said memory as a response to said request.

16. The relay method according to claim 15, further comprising, when there was a relay response to a previous request from said image forming apparatus that did not match a server response during the same session, replacing, by said relay device, a parameter included in said response to said request which has been cached in said memory based on the difference between said relay response and said server response, wherein
  said transmitting of the response to said image forming apparatus including transmitting a response in which said parameter has been replaced to said image forming apparatus.

17. The relay method according to claim 16, further comprising:
  when there was a relay response to a previous request from said image forming apparatus that had an attribute that did not match an attribute of a server response during the same session, converting, by said relay device, said request received from said image forming apparatus in said step of accepting said request based on the difference between said relay response and said server response, and transmitting the converted request to said server; and
  accepting, by said relay device, a response to the converted request from said server, and transmitting said response to said image forming apparatus.

18. A non-transitory computer-readable storage medium storing a program for causing a computer to perform a process of relaying an exchange between an image forming apparatus and a server capable of executing an application function in response to a request from said image forming apparatus and providing a result of the execution to said image forming apparatus, said exchange including a request for said pertaining to the execution of said application function from said image forming apparatus to said server, and a response to said request from said server to said image forming apparatus,
  said program causing said computer to perform:
  upon accepting said request from said image forming apparatus, reading a response to said request which was previously cached in a memory;
  transmitting the read response to said image forming apparatus as a relay response;
  transmitting the request to the server, subsequent to the transmission of the relay response to the image forming apparatus;
  accepting an actual response to said request from said server; and
  caching said server response in said memory as a response to said request.

19. The non-transitory computer-readable storage medium according to claim 18, wherein
  said program further causes said computer to perform:
  determining whether there was a relay response to a previous request from said image forming apparatus that did not match a server response during the same session, and
  when it is determined that there was a relay response that did not match a server response, replacing a parameter included in said response to said request which has been cached in said memory based on the difference between said relay response and said server response, and
  said transmitting of the response to said image forming apparatus including transmitting a response in which said parameter has been replaced to said image forming apparatus.

20. The non-transitory computer-readable storage medium according to claim 19, wherein
  said program further causes said computer to perform:
  when it is determined that there was a relay response to a previous request from said image forming apparatus that had an attribute that did not match an attribute of a server response during the same session, converting said request received from said image forming apparatus in said step of accepting said request based on the difference between said relay response and said server response,
  transmitting the request converted in the converting step to said server, and
  accepting a response to the converted request from said server, and transmitting said response to said image forming apparatus.

* * * * *